E. F. BEUGLER.
MACHINE FOR CUTTING ENDS OF BARREL SHELLS AND REMOVING HOOPS THEREFROM.
APPLICATION FILED JUNE 29, 1916.

1,294,758. Patented Feb. 18, 1919.
7 SHEETS—SHEET 1.

INVENTOR
Edwin F. Beugler
by Geyer & Popp
ATTORNEYS.

E. F. BEUGLER.
MACHINE FOR CUTTING ENDS OF BARREL SHELLS AND REMOVING HOOPS THEREFROM.
APPLICATION FILED JUNE 29, 1916.

1,294,758.

Patented Feb. 18, 1919.
7 SHEETS—SHEET 4.

INVENTOR
Edwin F. Beugler
by Geyer & Popp
ATTORNEYS

E. F. BEUGLER.
MACHINE FOR CUTTING ENDS OF BARREL SHELLS AND REMOVING HOOPS THEREFROM.
APPLICATION FILED JUNE 29, 1916.

1,294,758.

Patented Feb. 18, 1919.
7 SHEETS—SHEET 5.

Fig. 6.

INVENTOR
Edwin F. Beugler
by Geyer & Popp
ATTORNEYS

E. F. BEUGLER.
MACHINE FOR CUTTING ENDS OF BARREL SHELLS AND REMOVING HOOPS THEREFROM.
APPLICATION FILED JUNE 29, 1916.

1,294,758.

Patented Feb. 18, 1919.
7 SHEETS—SHEET 7.

INVENTOR
Edwin F. Beugler
BY Geyer & Popp
ATTORNEYS.

UNITED STATES PATENT OFFICE.

EDWIN F. BEUGLER, OF BUFFALO, NEW YORK, ASSIGNOR TO E. & B. HOLMES MACHINERY COMPANY, OF BUFFALO, NEW YORK, A CORPORATION OF NEW YORK.

MACHINE FOR CUTTING ENDS OF BARREL-SHELLS AND REMOVING HOOPS THEREFROM.

1,294,758.  Specification of Letters Patent.  Patented Feb. 18, 1919.

Application filed June 29, 1916. Serial No. 106,582.

*To all whom it may concern:*

Be it known that I, EDWIN F. BEUGLER, a citizen of the United States, residing at Buffalo, in the county of Erie and State of New York, have invented new and useful Improvements in Machines for Cutting Ends of Barrel-Shells and Removing Hoops Therefrom, of which the following is a specification.

This invention relates to a machine for operating on the ends of the bodies or shells of barrels preparatory to applying the heads thereto, and more particularly to a machine which cuts the ends of barrel shells and also removes temporary hoops therefrom preparatory to applying the permanent hoops and heads to the ends of the shells.

It is the object of this invention to produce a machine which will accomplish this purpose automatically, economically and expeditiously with an expenditure of a minimum amount of manual labor and power.

In the accompanying drawings.

Similar characters of reference indicate corresponding parts throughout the several views.

Figures 1, 2:
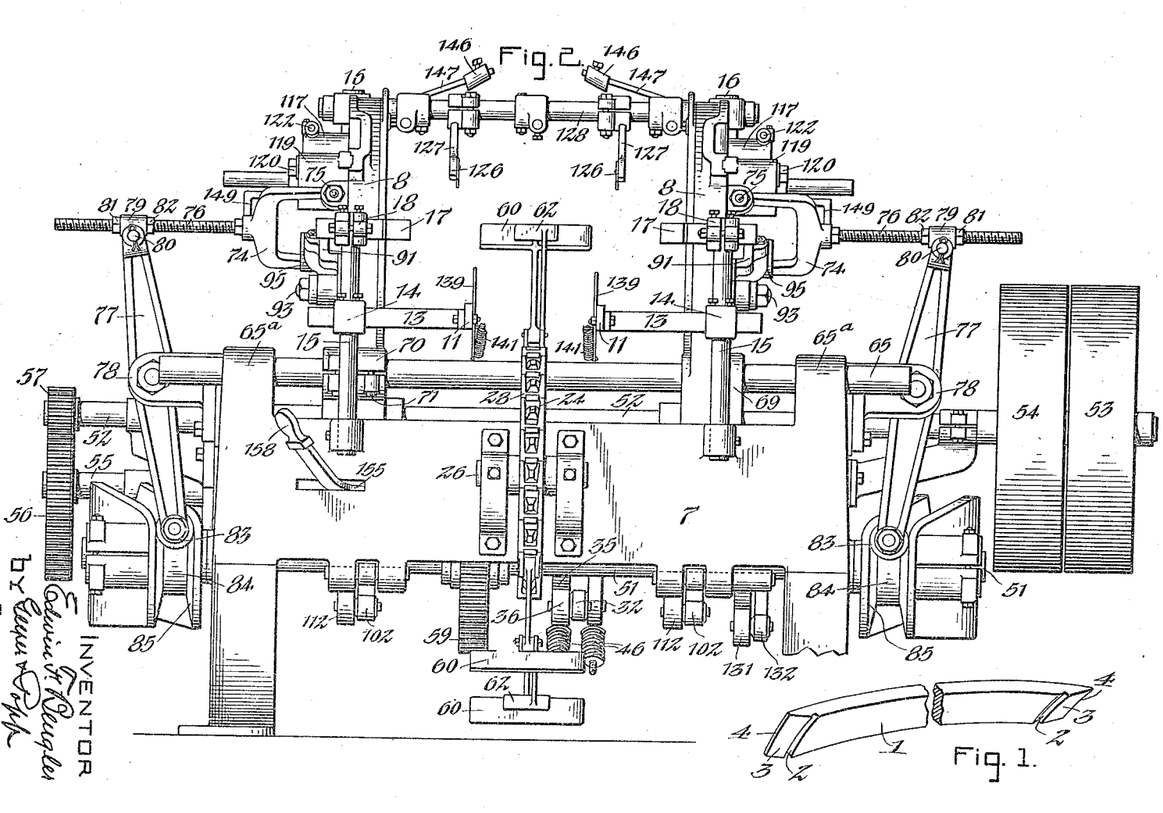
Figure 1 is a fragmentary perspective view of one of the staves of a barrel shell or body in its finished state after the ends thereof have been operated upon by the machine forming the subject of this invention.
Fig. 2 is a front elevation of the machine embodying my improvements, showing part of the frame broken away.

1 represents the staves of the body or shell of a barrel which is adapted to have opposite ends of its staves operated upon by the improved machine forming the subject of this invention for the purpose of preparing this shell to receive the heads and the permanent end hoops. In the operation of this machine the opposite ends of each stave thereof is provided with transverse crozes 2 on its inner side, chamfers, or bevels 3 between these crozes and the ends of the stave and transverse ends faces 4 at the outer ends of the chamfers, as shown in Fig. 1. Before the barrel shell is placed in the machine for performing the crozing, chamfering and end trimming of its staves a pair of permanent hoops 5 are applied to the central part of the periphery of the shell on opposite sides of its bilge, and a pair of temporary hoops 6, preferably of iron, are applied to the periphery of the barrel adjacent to opposite ends thereof. In the operation of the machine the attendant places a barrel body or shell of this character upon a suitable track or guideway in position to be engaged by a carrying mechanism which moves this shell successively to the means which produce the crozes, chamfers and end trimmings thereon, then to a mechanism which operates to remove the temporary barrel hoops from the shell and then discharges this shell from the machine ready to be assembled with previously prepared heads and which latter are retained in place by permanent hoops applied to opposite ends of the shell.

7 represents the main frame of the machine which may be of any suitable construction to support the various working parts of the machine.

Figure 4:
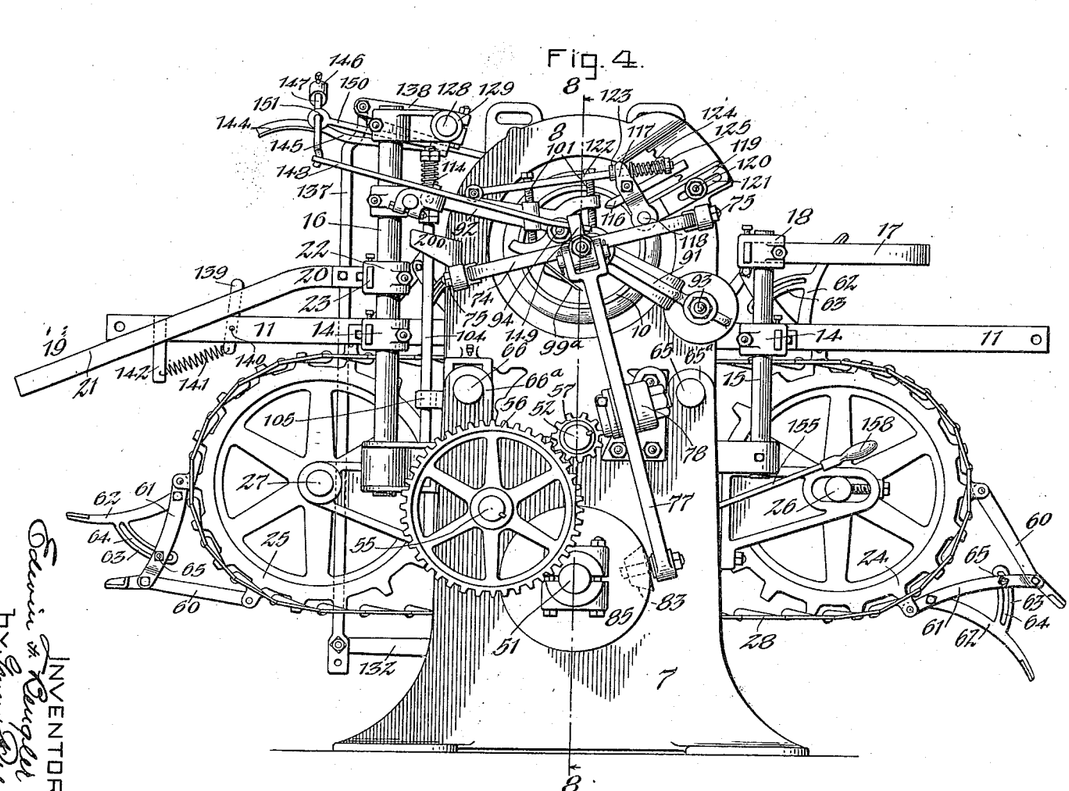
Fig. 4 is an end elevation thereof viewed from the left hand end.
Figures 5, 9, 10:
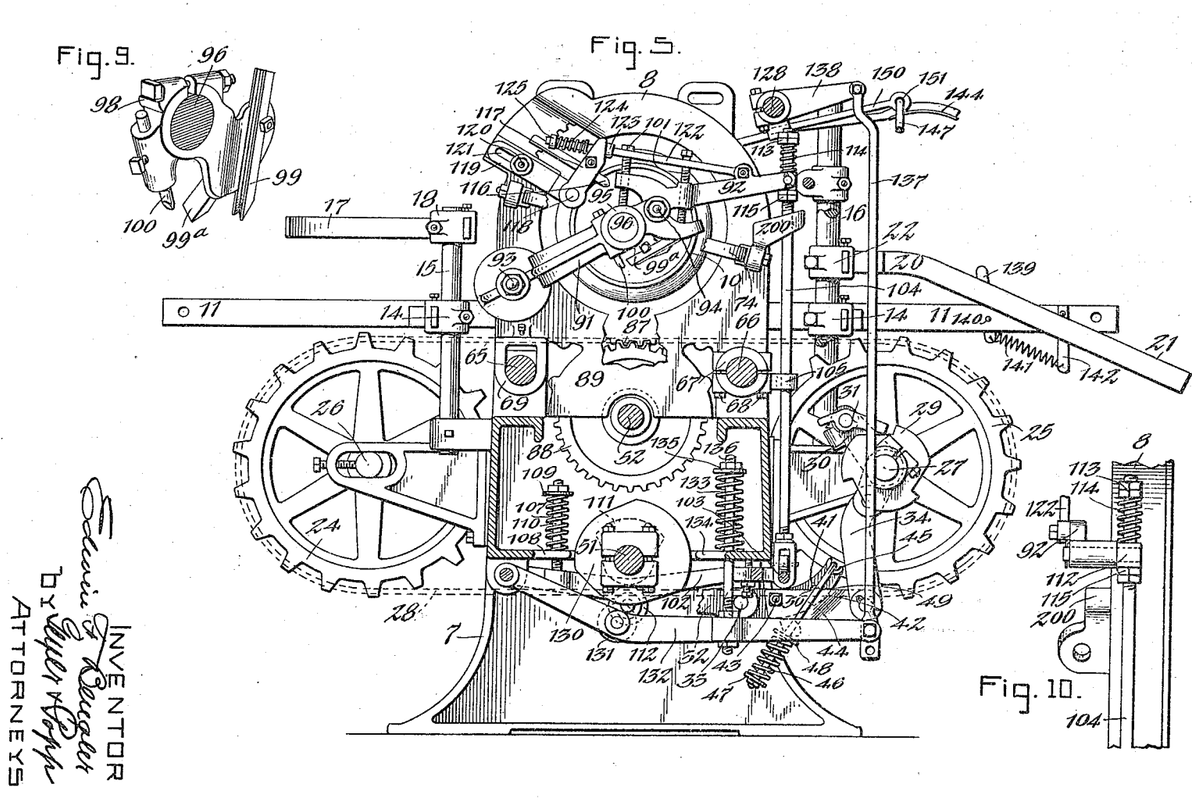
Fig. 5 is a vertical transverse section of the machine taken on line 5—5, Fig. 6, and looking toward the left hand end of the machine.
Fig. 9 is a sectional perspective view of the cutter head or holder carrying the blades for crozing and chamfering the barrel staves at one end of the barrel shell.
Fig. 10 is a fragmentary side view, on an enlarged scale, of the means for shifting one of the end trimmers into and out of its operative position.
Figures 7, 11:
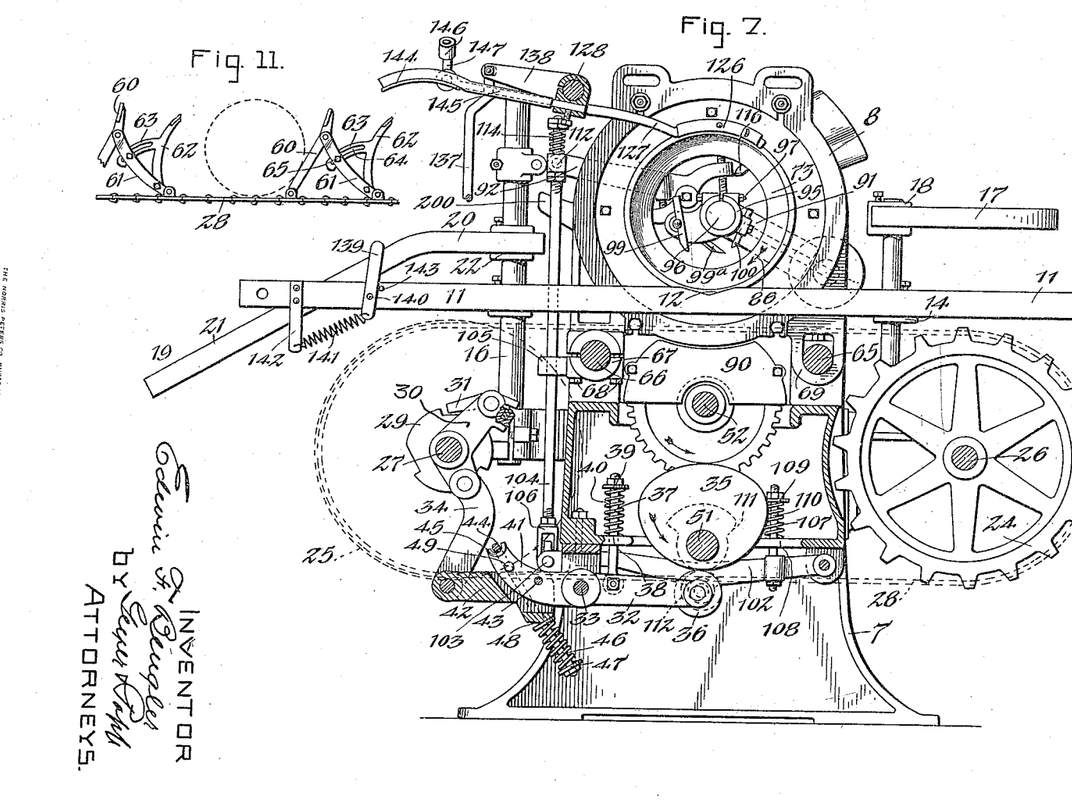
Fig. 7 is a transverse section of the machine taken on line 7—7, Fig. 6.
Fig. 11 is a fragmentary view, on a reduced scale, showing the manner in which the shell carrier retains one of the shells in its operative position relative to the centering chucks and the cutter mechanism associated therewith.

8, 8 represent two head stocks arranged transversely and in an upright position above opposite ends of the main frame so that they are in axial alinement lengthwise of the machine. On its inner side each head stock is provided with an internal annular guide groove 9 which receives a rotatable chuck ring 10 adapted to receive one end of the assembled shell or body of the barrel and engage frictionally with the periphery thereof so that upon rotating the chuck rings of both head stocks the barrel shell will be turned about its horizontal axis. While the barrel shell is thus arranged between the head stocks preparatory to being chucked or centered thereon and also after the head stocks are withdrawn preparatory to removing the shell after the work upon the same has been completed, the barrel shell is supported between the head stocks by means of a track or guideway comprising two guide rails 11, 11 which are arranged horizontally and transversely above the central part of the main frame between the two head stocks. Vertically in line with the centers of the head stocks and the chuck rings and in a plane lengthwise of the machine the upper edges of the guide rails are provided with centering notches 12, 12 preferably of V-shaped form, as shown in Fig. 7, which notches form seats in which the lower side of the barrel shell rests upon reaching the cutting position of the machine and thereby aid in centering the barrel shell or body preparatory to performing the cutting operations on the same. These guide rails may be supported in any suitable manner, but as shown in the drawings the same are supported on their outer sides by means of brackets 13 projecting laterally therefrom, clips or clamps 14 carrying said brackets, and front and rear columns or posts 15, 16 which are secured at their lower ends to the front and rear parts of the main frame and to which the clamps 14 are secured in such manner that the same may be adjusted vertically on the supporting posts for the purpose of bringing the guide rails into the proper position relatively to the head stocks for guiding the barrel shells to and from the cutting position. On the front side of the machine two end guide bars 17, 17 are arranged horizontally and transversely relative to the direction of movement of the barrel shell to the machine, which end guide bars are adapted to engage opposite ends of the barrel shell and cause the same to enter properly between the two head stocks preparatory to effecting the centering of the barrel shell and the cutting of opposite ends of its staves. These front end guides are preferably adjustably supported by means of clamps or clips 18, 18 on the upper parts of the front supporting posts 15 which clips or clamps are capable of vertical adjustment on the latter in order to bring the same into the proper position relative to the barrel shell and the head stocks. On the rear side of the machine the same is also provided with two rear end guides 19, 19 which are adapted to engage with opposite ends of the barrel shell and confine the same against movement in the direction of its length while on the guide rails and thereby retain the shell always in a position where the same can be operated upon by other mechanism and also be conveniently removed by the attendant. The rear end guide bars are preferably so constructed that they serve as end guides just before the shell reaches the rear end of the guide rails at which time the means which remove the temporary barrel hoops perform their operation, but before the barrel shell reaches the extreme rear ends of the supporting rails the rear end guide bars 19, 19 become inoperative leaving the barrel shell free to be removed endwise from the supporting rails. For this purpose each of the rear end guide bars has a horizontal front upper part 20 which is arranged on one side of the companion supporting rail and in a higher plane, while the rear part 21 of this end guide bar inclines downwardly and crosses the plane of the companion guiding or supporting rail at a point in front of the rear end of the latter, as shown in Figs. 4, 5 and 7. Each of these rear end guide bars may be supported by any suitable means but preferably by means of clips or clamps 22 which are connected with the rear end guide bars by means of horizontal supporting rods 23 and which are in turn secured to the upper parts of the rear posts 16 so as to be capable of vertical adjustment on the latter.

After the operator places a barrel shell on the front parts of the supporting rails the same is engaged by a carrying or propelling mechanism which moves this shell successively to the stave cutting, hoop removing and discharging positions. Although this carrying mechanism may be constructed in various ways that shown in the drawings has been found suitable in practice and therefore preferred and as there shown the same is constructed as follows:

24, 25 represent front and rear sprocket wheels arranged adjacent to the front and rear sides of the main frame transversely in line with the space between the opposing head stocks. These sprocket wheels are mounted on front and rear shafts 26, 27 which are journaled horizontally and lengthwise in suitable bearings on the adjacent parts of the main frame. Around these sprocket wheels passes a carrying belt 28, preferably of the chain type which chain passes with its operative stretch over the upper central part of the main frame and below the space between the supporting rails. An intermittent rotary movement is imparted to the sprocket wheels so as to cause the carrying belt to advance one step at a time and move the barrel shells or bodies which are placed on the front parts of the supporting rails successively to the stave cutting and hoop removing positions and then discharging the barrel shell from the machine. While various means may be provided for effecting this step by step movement of the sprocket wheels and chain belt those shown in Figs. 3, 5, 6, 7 and 8 are satisfactory and comprise a ratchet wheel 29 secured to the rear shaft 27 which also carries the rear sprocket wheel 25, a ratchet lever 30 mounted loosely on said rear shaft and provided on its upper arm with a spring pressed pawl or dog 31 which engages with the teeth of the ratchet wheel, a rock lever 32 pivoted by means of a pin 33 on the lower part of a main frame so as to swing in a vertical plane, a link 34 connecting the rear arm of this rock lever with the lower arm of the ratchet lever, a rotatable cam 35 arranged in the lower part of the main frame and engaging with a roller 36 on the front arm of the rock lever 32 for the purpose of depressing the same and causing the ratchet lever to move the ratchet wheel and the parts associated therewith forwardly one step, and a spring 37 bearing at one end against a shoulder 38 on the main frame while its opposite end bears against a shoulder 39 on a pull rod 40 connected with the front arm of the cam rock lever so as to turn the ratchet lever backwardly in position to engage its pawl with a new tooth of the ratchet wheel. In order to avoid breaking any parts of this feed mechanism in the event that a barrel shell becomes stuck in the machine a safety device is provided which is capable of yielding when subjected to undue pressure. For this purpose the rear arm of the cam rock lever is constructed of an inner section 41 which is formed on the hub of this lever, an outer section 42 pivoted by means of a pin 43 to the inner section, a yoke 44 bearing against a seat 45 on the inner arm section 41, springs 46 each bearing at one end against a shoulder 47 on the yoke and at its opposite end against a shoulder 48 on the outer arm section so as to yieldingly hold said arm sections in their normal straightened position, and a stop 49 arranged on the inner arm section and engaging with a shoulder 50 on the outer arm section for the purpose of limiting the extent of the straightened movement of the arm sections relatively to each other under the action of the springs 46. These springs are of sufficient stiffness to properly transmit the movement of this lever under the action of the cam 35 to the ratchet wheel 29 and the parts associated therewith when no undue resistance is offered as is the case when the barrel shell moves freely forwardly between the head stocks under the action of the carrying belt. But if the barrel shell should become stuck in the chucks or if its forward movement is obstructed in any other manner which would be liable to break or derange parts of the machine such undue resistance to the forward movement of the carrying belt would cause the springs 46 to be compressed and permit the cam 35 to complete its rotary movement without actuating the ratchet wheel and thereby avoid breakage or injury to the machine. The instant the machine is again cleared so that no interference with the forward movement of the feed belt exists the springs 46 automatically return the inner and outer sections of the cam rock lever to their normal operative position so that no manual attention is necessary for this purpose.

Figure 6:
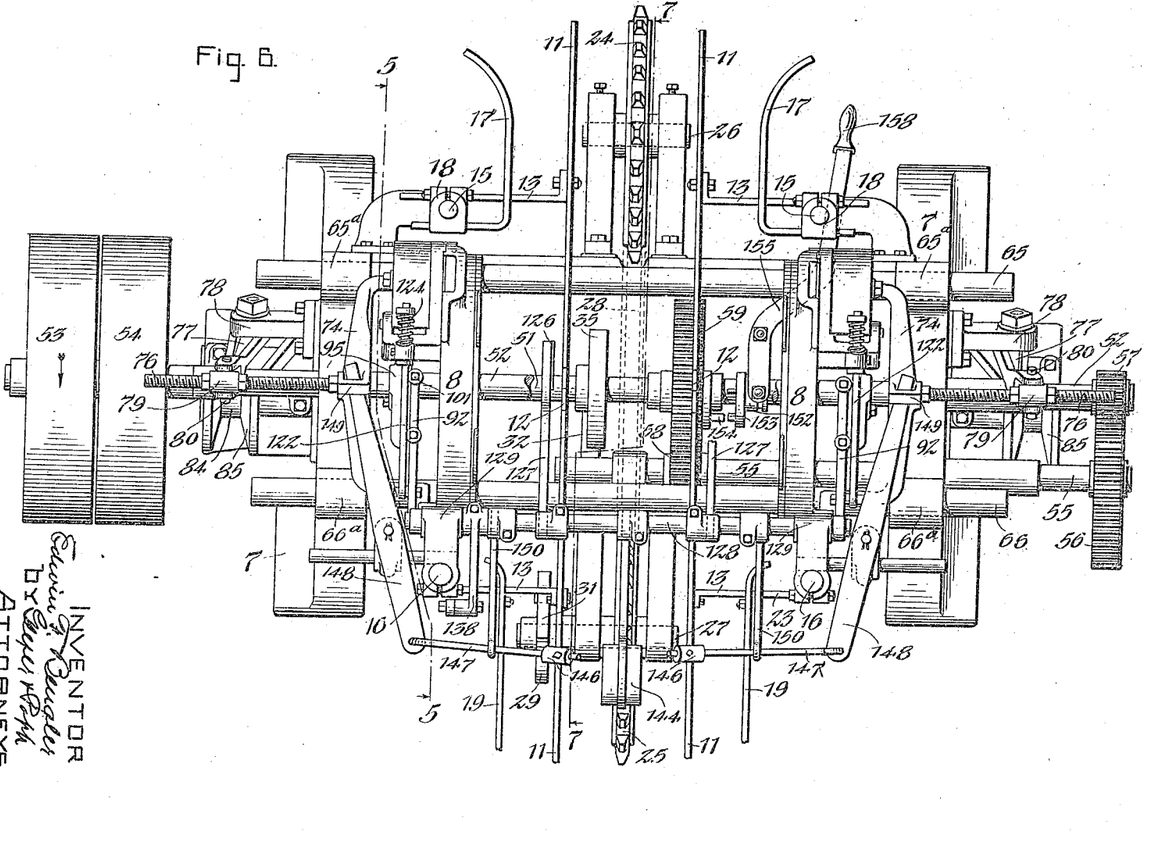
Fig. 6 is a top plan view of the machine showing the feed belt in dotted lines.
Figure 8:
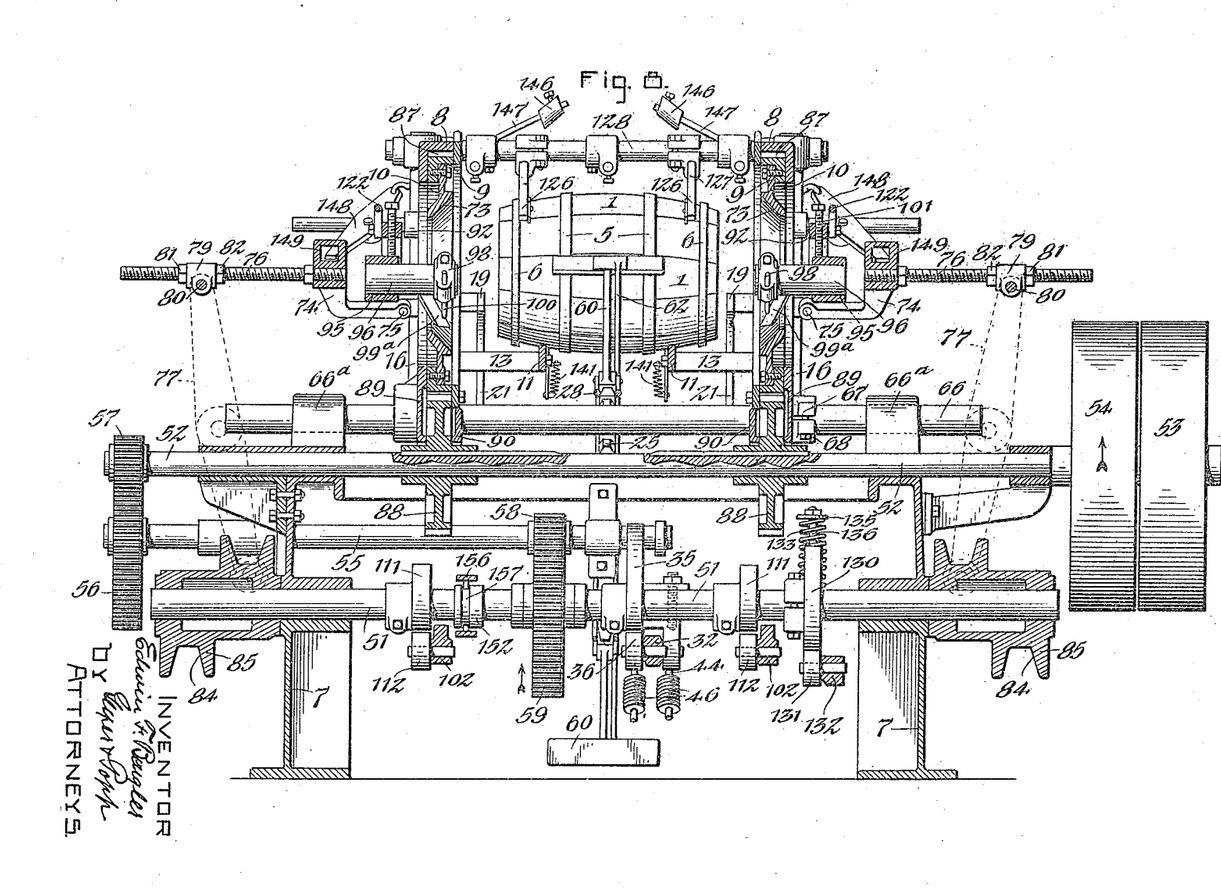
Fig. 8 is a vertical longitudinal section of the machine taken substantially on line 8—8, Fig. 4.

The cam 35 which operates the barrel propelling chain belt is mounted on a cam shaft 51 arranged lengthwise and horizontally in the lower central part of the frame and journaled in suitable bearings at opposite ends of the latter. On the upper central part of the main frame and journaled lengthwise in suitable bearings thereon is the main or driving shaft 52 which may receive its power from any suitable source, but which, as shown in the drawings is preferably driven by means of a belt passing around a driving pulley 53 fixed on this shaft, a loose pulley 54 being provided on the latter to receive the driving belt when it is desired to stop the machine. Motion is transmitted from this driving shaft 52 to the cam shaft 35 preferably by means of an intermediate or counter shaft 55 journaled lengthwise and horizontally in suitable bearings on the main frame between the main shaft and the cam shaft and provided at one end with a gear wheel 56 which meshes with a gear pinion 57 on the main shaft and also provided with a pinion 58 which meshes with the gear wheel 59 on the cam shaft, as shown in Figs. 6 and 8.

The barrel bodies or shells are compelled to move forwardly with the carrying belt while resting on the supporting rails adjacent to the upper operative stretch of this belt by means of a plurality of pairs of wings which are mounted at intervals on the carrying belt, each adjacent pair of wings being adapted to receive a barrel shell or body between them and carry the same forwardly over the supporting rails. These carrying wings may be mounted on the carrying belt in any suitable manner so that the same may be adjusted relatively to each other to suit the diameter of the bilge of the barrel body or shell which is being operated on. For this purpose each wing comprises a rear arm or jaw 60 pivoted at its inner end on one of the links of the feed chain, a brace 61 pivotally connected at its outer end with the outer end of the arm 60 and pivotally connected at its inner end with a link of the feed chain in advance of the arm 60, a front arm or jaw 62 pivoted at its inner end to the inner part of the brace 61, and an adjusting lug 63 arranged on the rear side of the front arm 62 and provided with a curved slot 64 which receives a clamping bolt 65 on the outer part of the brace 61. By this means each rear arm is connected with the feed belt in such manner that the same is free to pass around the turns of the belt while on the sprocket wheels without binding or cramping and each front arm is also operatively associated with the front arm of the next following wing in such manner that said wing arms may be readily adjusted relative to each other for adapting the space between the coöperating wings to suit the particular bilge diameter of the barrel shells or bodies intended to be received between them.

Figure 3:
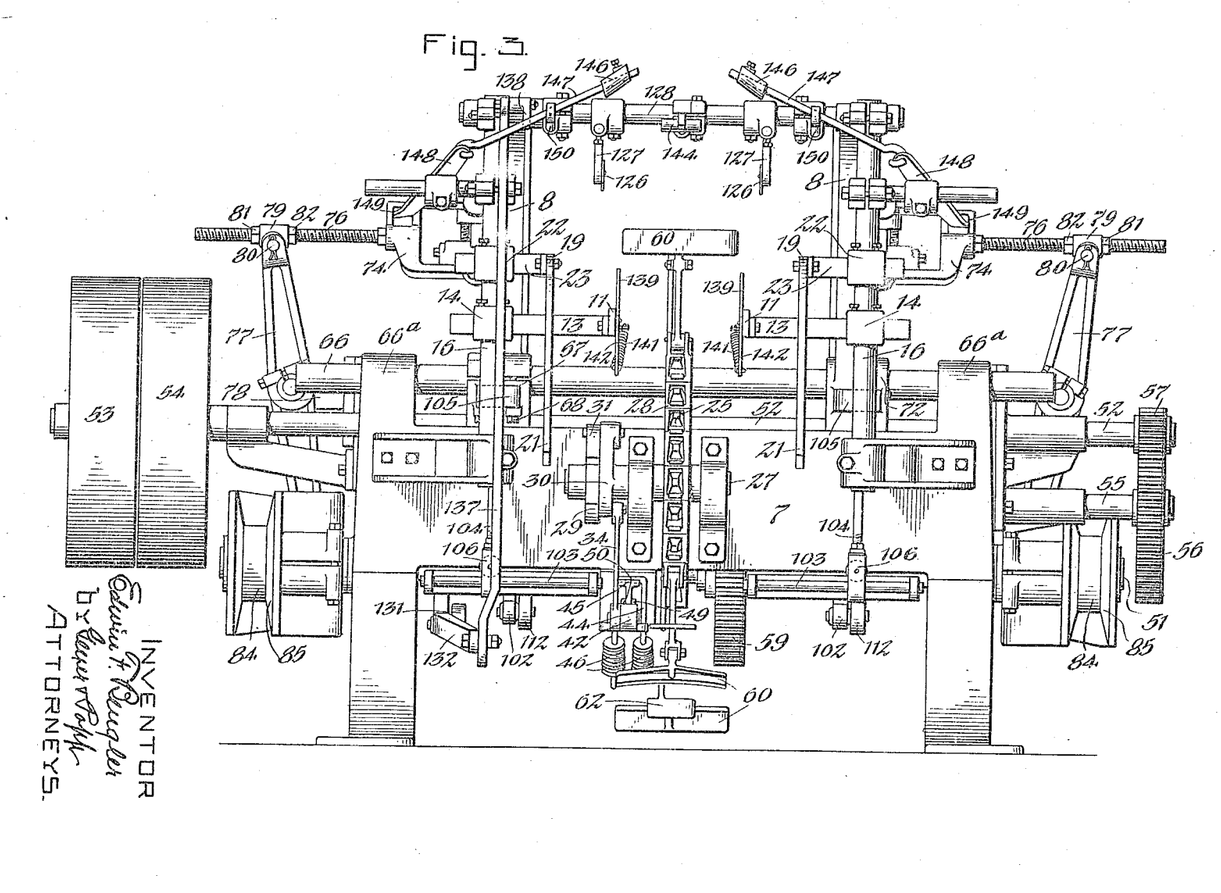
Fig. 3 is a rear elevation of the same.

Arranged lengthwise in the upper part of the frame and parallel with each other are two horizontal sliding bars or rods 65, 66, these bars being supported and guided in front and rear lugs 65$^a$, 66$^a$ on the upper part of the main frame so that they are capable of sliding horizontally therein. Each of the head stocks is normally rigidly connected with one of the sliding bars so as to move lengthwise therewith but the same is slidably mounted on the other sliding bar so that upon adjusting the head stocks toward and from each other the sliding bars slide lengthwise of the machine in opposite directions on the main frame but maintain the latter always in axial alinement. The right hand head stock is preferably connected rigidly with the rear sliding bar 66 so as to move lengthwise therewith but slides lengthwise on the front sliding bar, while the left hand head stock is rigidly connected with the front sliding bar 65 and is slidable lengthwise on the rear sliding bar 66. For this purpose the right hand head stock is provided with a rear supporting sleeve 67 which is split and has its parts clamped against opposite sides of the rear sliding bar by means of bolts 68 and with a front sleeve 69 which is free to slide on the front sliding bar, as shown in Figs. 5 and 7. The left hand head stock on the other hand is provided with a split front sleeve 70 which has its parts clamped against opposite sides of the front sliding bar 65 by means of belts 71 with a rear sleeve 72 which slides on the rear sliding bar, as shown in Figs. 2 and 3. Upon loosening the bolts 68, 71 of the sleeves 67, 70 the head stocks may be adjusted lengthwise relatively to each other on the front and rear sliding bars for the purpose of adapting the machine for operating on barrels of varying length.

While a barrel shell or body is being moved rearwardly over the transverse guide rails 11, 11, the head stocks are moved lengthwise apart from each other and when the barrel shell reaches the cutting position the two head stocks move toward each other so that the chuck jaws or conical surfaces 73, 73 on the opposing sides of the chuck rings engage with opposite ends of the barrel shell and not only center the latter but also grip the same so that it is compelled to turn with the chuck rings preparatory to performing the cutting operations on opposite ends of the shell. This longitudinal movement of the head stocks and associated parts for chucking and releasing a barrel shell may be effected automatically by various means but preferably by those which are shown in the drawings and which are constructed as follows:

74, 74 represent two substantially U-shaped yokes each of which is arranged diametrically across the outer side of one of the head stocks and pivotally connected at its opposite ends by transverse pivots or bolts 75 to the outer side of the respective head stock so as to be capable of swinging in a substantially vertical plane relatively thereto. Each of these yokes is provided with a horizontal longitudinal shifting rod 76 which is provided with an external screw thread and is arranged substantially in axial alinement with the respective head stock and chuck ring. 77, 77 represent two upright chuck levers which are pivoted on suitable brackets 78, 78 mounted on the opposite ends of the main frame and each of which is pivotally and adjustably connected at its upper end with the threaded shifting rod 76 of one of the head stock yokes. This connection, as best shown in Figs. 2, 3, 4, 6 and 8, preferably comprises a coupling or adjusting sleeve 79 mounted on the respective shifting rod 76 and connected on its underside by a horizontal transverse pin 80 with the upper end of the adjacent chuck lever 77 and screw nuts 81, 82 arranged on the shifting rod 76 and engaging with opposite ends of the coupling sleeve 79. Upon tightening one of the screw nuts and loosening the other the respective shifting rod may be adjusted relatively to the companion chuck lever in order to suit the position of the corresponding head stock on the sliding bars in a direction lengthwise of the machine. On its lower arm each of the chuck levers is provided with a roller 83 which engages with the groove 84 of the cam 85 mounted on the adjacent end of the cam shaft 51, as shown in Figs. 2 and 4. The cams 85, 85 are so designed that when the machine is in operation it will turn the chuck levers so as to move the head stocks and associated parts away from each or into their inoperative position while a barrel shell is being moved forwardly between the head stocks and after this barrel shell reaches the cutting position the head stocks will be moved simultaneously toward each other and cause the jaws of the chuck rings to grip opposite ends of the barrel shell.

After the chuck rings have been applied to opposite ends of the barrel shell the latter is turned with these rings owing to the fact that the latter during the normal operation of the machine are rotated continuously in the direction of the arrow 86 in Fig. 7. The means whereby this rotary movement is imparted to the chuck rings preferably comprises gear rims or teeth 87 formed on the peripheries of the chuck rings and engaging with driving gear wheels 88 each of which is splined on the driving shaft 52 so as to be compelled to turn therewith but be free to slide lengthwise thereon. Each driving gear wheel 88 is however, compelled to move lengthwise of the machine with its companion head stock but free to turn transversely relatively thereto by means of two retaining jaws or bearings 89, 90 arranged on the lower part of each head stock and engaging with opposite sides of the respective driving gear wheel 88, as shown in Fig. 8. By this means the driving gear wheels 88 are compelled to move lengthwise of the machine with their respective head stocks both when gripping or releasing a barrel shell and also when adjusting the head stocks to suit different lengths of barrel shells while at the same time always maintaining a driving connection between the gear wheels and the driving shaft.

The cutter mechanism whereby the crozes, chamfers and ends of the barrel shells are cut on the staves of the barrel shell may be variously constructed but in the preferred form shown in the drawings these cutter mechanisms are constructed and operated as follows:

Arranged adjacent to the outer side of each head stock is a main cutter lever which swings in a vertical plane and preferably comprises an inner section 91 and an outer section 92. The inner section 91 is pivoted at its inner end to the adjacent head stock by a bolt 93, and the outer end of the inner section 91 is pivotally connected with the inner end of the outer section 92 by a pivot bolt 94. On each of the inner lever sections 91 is arranged a bearing 95 whose axis is arranged horizontally and in this bearing is adjustably secured a short cutter arbor 96 which is held in place by splitting the bearing 95 and connecting the parts thereof by a clamping screw 97.

On the inner end of this arbor is arranged a cutter head or holder 98 which carries a crozing blade or cutter 99 which is adapted to cut the croze in the bore of the adjacent end of the barrel shell, and a chamfer cutter or blade 99ª which is adapted to cut the chamfer on the corresponding end of the bore of the barrel shell, and a shoe 100 which operates to prevent the chamfer cutter from entering the wood of the barrel shell too deep. This croze and chamfer cutter and the guard shoe are mounted on one side of the center of the cutter arbor 96 so that upon swinging the holder above the axis of this arbor, the cutters 99, 99ª and the shoe 100 may be adjusted relative to the barrel shell which is to be cut. For the purpose of enabling the cutters to be adjusted in accordance with the size of the barrel, the thickness of the material which is being operated upon and the character of the material, the inner and outer sections of the cutter lever are adjusted relatively to each other. As shown in Figs. 5 and 7 this adjustable connection consists of two adjusting screws 101, 101 arranged in threaded openings in the outer lever section 92 on opposite sides of the pivot bolt 94 and bearing against the inner lever section 91 on opposite sides of said pivot bolt. Upon loosening one of these screws and tightening the other the relative position of the inner and outer lever sections may be adjusted as desired and the cutters 99, 99ª and the guard shoe 100 on the inner lever section may be brought into the desired position relatively to the barrel shell which is to be operated upon.

Before a barrel shell is gripped by the chuck rings the cutter heads are swung inwardly so that the blades of the cutter heads are clear of the path of the barrel shell, but after the barrel shell is gripped by the chuck rings the cutter levers are swung outwardly so as to engage the croze and chamfer cutters and the guard shoes against the adjacent end portions of the bore of the barrel shell whereby the latter during its rotary movement with the chuck rings will be operated upon by the cutter mechanism so that the croze cutters and the chamfer cutters will produce the crozes and the chamfers at opposite ends of the bore of the barrel shell. After this cutting operation has been completed during at least one rotation of the barrel shell the cutter levers are again swung inwardly so as to retract the cutters and guard shoes from the bore of the barrel shell.

This rocking motion of the cutter levers is effected automatically by motion derived from the main driving shaft and is preferably effected by the following means:

102 represents vertically swinging cam levers arranged transversely underneath the lower part of the main frame and each pivoted at one end to this frame while its opposite side is constructed in the form of a fork and carries a horizontal longitudinal coupling rod 103. 104 represents upright shifting rods each sliding with its intermediate part vertically in guide lugs 105 projecting laterally from the adjacent part of the companion head stock while its lower end is provided with a coupling head 106 capable of sliding lengthwise on the companion coupling rod 103 but compelled to move vertically therewith. The upper end of each shifting rod is connected with the outer end of the outer cutter lever section 92, as shown in Figs. 5 and 7. Each cam lever 102 is yieldingly held in its elevated position so that the croze and chamfer cutters and the guard shoe associated therewith are in their retracted or inoperative position, this yielding means consisting preferably of a spring 107 bearing at one end against a shoulder 108 on the main frame while its opposite end bears against a shoulder 109 formed on a lifting rod or bolt 110 connected with the lever 102, as shown in Figs. 5 and 7. The downward movement of the cam lever 102 for the purpose of swinging the croze and chamfer cutters and the guard shoe into their operative position relative to the bore shell is effected by means of a cam 111 arranged on the cam shaft 51 and bearing against a roller 112 on the adjacent part of this lever, as shown by dotted lines in Figs. 5 and 7 and by full lines in Figs. 3 and 8. By engaging the shifting rod 104 with guide lugs on the head stock and producing a sliding connection between the lower end of this rod and the companion rock lever 102 due to the coupling head 106 being capable of moving lengthwise on the coupling rod 104 it is possible to shift the head stock and the parts mounted thereon including the internal cutter mechanism of which the blades 99, 99ª form a part without disturbing the connection between the means which shift these blades into and out of their operative position and the shaft 51 from which motion is received.

In order to permit of definitely determining the depth of the cut of the croze and chamfer cutters notwithstanding the adjustability of the same without interfering with the throw of the cam 111, the outer section 92 of the main cutter lever is arranged to engage a fixed stop 200 at the end of its operative movement and a yielding connection is provided in the means which operate this lever by motion derived from the cam 111 so as to avoid injury to the cutters or other parts during the excess throw of the cam 111 after the lever section 92 engages the stop 200. This yielding provision is preferably arranged between the upper end of the shifting rod 104 and the outer lever section 92, and as shown in Figs. 4, 5 and 7 the same preferably comprises a guide sleeve 112 pivoted on the outer end of the outer lever section 92 and receiving the upper part of the companion shifting rod 104, a shoulder 113 consisting preferably of screw nuts arranged on this shifting rod and bearing against the underside of this coupling sleeve, and a spring 114 bearing at one end against the upper side of this coupling sleeve and at its other end against a shoulder 115 which latter is preferably formed by screw nuts on the adjacent part of the shifting rod 104. By this means a downward motion of the cam lever 102 produced by the cam 111 will cause the croze and chamfer cutters to swing outwardly against the bore of the barrel shell and effect their cutting operations in a normal manner until the lever section 92 engages the stop 200. The spring 114 is sufficiently stiff to cause the shifting rod 104 and the cutter lever to move in unison until the main cutter lever engages the stop 200, and thereafter the spring 114 will be flexed and the shifting rod 104 will slide through the sleeve 112 under the action of the cam 111 independently of the main cutter lever, thereby preventing injury to the working parts.

At the same time that the croze and chamfer cutters adjacent to one of the head stocks are moved into and out of their operative position an end cutter 116 is moved into and out of engagement with the respective end of the barrel shell for the purpose of trimming the corresponding ends of the staves uniformly and evenly. This end cutter is mounted on a vertically swinging auxiliary cutter arm 117 which is pivoted by means of a horizontally longitudinal pin 118 on a bracket 119 which is adjustable radially on the outer side of the respective head stock by means of a clamping bolt 120 secured to this head stock and passing through a slot 121 in said bracket, as shown in Figs. 4 and 5. The end cutter is preferably operated by means of a shifting rod 122 pivotally connected at one end with the outer end of the adjacent cutter lever, a shoulder 123 on the shifting rod 122 consisting preferably of a screw nut and bearing against one side of the end cutter arm 117, and a spring 124 bearing at one end against the opposite side of this cutter arm at its opposite end against a shoulder 125 formed on the shifting rod 122 preferably by a screw nut thereon. As the cutter lever is pulled downwardly for moving the croze and chamfer cutters into their operative position the shifting rod 122 and spring 124 operate to pull the end cutter arm inwardly so that the end cutter moves across the adjacent edge of the barrel staves and trims the same off evenly. Owing to the employment of the spring 124 the engagement of the end cutter is not positive but permits this end cutter to adapt itself to the character of the material which is being operated upon. During the return stroke of the main cutter lever, the shoulder 123 of the shifting rod 122 by engaging with the end cutter arm 117 turns the latter backwardly and retracts the end cutter out of the path of the barrel shell, preparatory to engaging the staves of the next barrel shell which is to be operated upon.

While the barrel shell is being moved forwardly by the feed belt and until it reaches the seats 12 of the guide rails 11 the same is free but after the cutting operation on the same has been completed the same is engaged by a retaining device so as to stop the rotation of the barrel shell preparatory to being advanced to the hoop stripping mechanism. In its preferred form this retaining or holding device comprises two vertically movable curved jaws 126 which are adapted to move toward and from the upper side of the barrel shell. These two holding or retaining jaws are mounted on the front ends of two rock arms 127 which are connected at their rear ends with a horizontal longitudinal rock shaft 128 journaled in bearings 129 arranged on the upper ends of the rear posts 16, as shown in Figs. 3, 4, 5, 6 and 7. The rocking motion of the shaft 128 is preferably derived from the rotary cam shaft 51 by means of a holding cam 130 arranged on this shaft and engaging with a roller 131 on a holding lever 132 pivoted on the underside of the main frame to swing vertically, as best shown in Fig. 5, and operating to depress this lever, yielding means for elevating this lever comprising a spring 133 bearing at one end against a shoulder 134 on the main frame and against a shoulder 135 formed on a rod 136 connected with the lever 132 and a shifting rod 137 connected at its lower end with the holding lever 132 and at its upper end with a rearwardly projecting arm 138 on the rock shaft 128. When a barrel shell or body is being advanced from the front end of the guide rails 11 by the carrying belt toward the cutting position, the jaws 126 are in their elevated position and out of the path of the barrel shell and after the cutting operation on the shell has been completed these two holding or retaining jaws descend and engage with the upper side of the barrel shell on opposite sides of its bilge, as shown in Fig. 8, thereby stopping rotation of the barrel shell and permitting of advancing the same properly to the hoop stripping mechanism.

After the barrel shell which has just been cut advances one step from the cutting position the same is held by a rear holding device in the proper position on the supporting rails and engaged by mechanism which operates to remove or strip off the temporary hoops from opposite ends of the respective barrel shell. During this forward step of the barrel shell after the cutting operation on the same has been effected the advancing side of the barrel shell engages with two yieldable stops consisting preferably of two vertically swinging stop levers 139 pivoted on the delivery portions of the rails 11 by means of pins 140 so that one arm of each lever projects upwardly into the path of the barrel shells while the lower arm thereof projects downwardly. The latter is connected by means of a spring 141 with a downwardly projecting bracket 142 on the adjacent guide rail which spring operates to turn the upper arm of the stop lever forwardly and hold the same yieldingly in an upright position against a stop 143 on the adjacent part of the respective guide rail. As the barrel shell engages or nearly engages the stop levers 139 the same is also engaged on the upper side of its bilge or central part by means of a vertically movable rear curved holding or retaining jaw 144 which is arranged on an arm 145 projecting rearwardly from the rock shaft 128. This rear holding jaw is in its elevated position while the barrel shell is moving from the cutting position on the guide rails 11 to the hoop stripping position and when it reaches the last mentioned position on the guide rails the rear holding jaw descends and presses with its curved face or concave underside against the convex upper side of the bilge of the barrel shell and holds the same in place against movement in the direction of the axis of the barrel while the temporary hoops are being stripped from opposite ends of the latter. This hoop stripping mechanism is best shown in Figs. 2, 3, 4, 5, 6, 7 and 8 and as there shown the same is constructed as follows:

146, 146 represent two stripping jaws which receive a combined vertical and longitudinal movement for the purpose of engaging these jaws with the inner edges of the temporary hoops of the barrel shells on the upper sides of the latter, then moving these jaws lengthwise in opposite directions for the purpose of stripping the temporary hoops from the barrel shell and then again raising these jaws preparatory to moving the same in an elevated position and dropping them behind the inner edges of the temporary hoops of the next following barrel shell. The means whereby this motion is imparted to these stripping jaws comprises two longitudinal stripper bars 147 which carry the stripping jaws on their opposing inner ends, two rock levers 148 pivoted to swing substantially in a horizontal plane and having their rear arms connected with the outer ends of the stripper bars while their front ends are operatively connected with the yokes 74 by providing the latter with loops 149 into which the front arms of the rock levers 148 project, as shown in Figs. 4, 6 and 8 and two lifting arms 150 projecting rearwardly from the rock shaft 128 and provided at their rear ends with eyes 151 which receive the stripper bars 147 between their inner and outer ends. As the yokes 74 move away from each other together with the head stocks after completing the cutting operation on a barrel shell the front arms of the rock levers 148 move in the same direction, thereby causing their rear arms to move toward each other together with the stripping bars and the stripping jaws connected therewith. During this movement the stripping jaws are elevated by reason of the rock shaft 128 being turned at this time in a direction for also elevating the rear holding jaw 144. At the end of this separating movement of the yokes and head stocks and the approaching movement of the stripping jaws the latter are arranged above the path of the barrel shell and in such position that the faces of these stripping jaws are arranged inside of the path of the temporary end hoops of the barrel shell. After the barrel shell comes to rest in the hoop stripping position and another barrel shell has reached the cutting position the rocking movement of the shaft 128 causes the rear jaw 144 to engage the bilge of the barrel shell at the stripping position and also causes the stripping bars 147 to be lowered so that their jaws 146 are lowered upon the top of the barrel shell at a point between the bilge of the barrel and the opposing inner edges of the temporary hoops. As the yokes and the head stocks thereafter approach each other for chucking a barrel shell in the cutting position the corresponding outward or separating movement of the stripping jaws which occurs at this time causes the latter to engage the inner edges of the temporary hoops on the barrel shell and pull the same from opposite ends thereof. These temporary hoops drop on the adjacent part of the floor or may be otherwise disposed of to be used over again. After the temporary hoops have been thus stripped from the ends of the barrel shell the latter is released by the raising of the rear holding jaw 144 and the stripping jaws are simultaneously raised by the lifting arms 150 preparatory to being again moved toward each other in an elevated position for engaging the hoops of the next following barrel shell.

The cutting and hoop stripping operations having been now completed on the barrel shell the latter during its next forward step under the action of the carrying jaws of the propelling belt will press the yielding stops 139 downwardly out of the path of the barrel shell and cause the latter to be discharged from the machine.

In adjusting the machine for different sizes of barrel shells it is desirable at times to disconnect the cam shaft 51 from the driving shaft 52 for the purpose of permitting of the rotation of the chuck rings without operating the barrel shell feeding and cutting, hoop stripping and other mechanisms in order to enable the attendant to adjust the cutter mechanism to the particular barrel shell which is to be operated upon. For this purpose a clutch is provided which is preferably interposed between the driven gear wheel 59 and the cam shaft 51 and preferably comprises a clutch sleeve 152 splined on the cam shaft 51 so as to be compelled to turn therewith but be free to slide lengthwise thereon and provided with a jaw or clutch tooth 153 adapted to be engaged with and disengaged from a corresponding clutch jaw or tooth 154 on the adjacent part of the driven gear wheel 59, as best shown in Fig. 6.

This clutch sleeve may be moved into and out of its operative position by means of a shifting lever 155 pivoted on the adjacent part of the main frame and having its inner arm provided with a fork 156 engaging with an annular groove 157 in the clutch sleeve while its outer arm is provided with a handle 158 for manipulating the same.

As a whole this machine is comparatively simple considering the various operations which the same performs automatically, the same has no delicate parts which are liable to get out of order, the same performs its function quickly and effectively and it requires but comparatively little power for its operation, thereby enabling the cost of manufacturing barrels to be materially reduced.

I claim as my invention:

1. A machine of the character described, comprising head stocks movable toward and from each other, chucking and cutting mechanism mounted on said head stocks and adapted to operate on opposite ends of barrel shells, and automatic means for moving barrel shells to and from the working position between said head stocks comprising a track arranged horizontally and transversely between said head stocks and adapted to support and guide said barrel shells, means for propelling the barrel shells over said track comprising an endless belt moving with its operative stretch along said track, and carrying wings arranged on said belt and adapted to engage said barrel shells while the latter are on said track, each of said wings comprising a front arm pivoted at its inner end on said belt, a brace pivotally connecting the outer part of said arm with the adjacent forward part of said belt, a rear arm pivoted on the front part of said brace and provided with a lug, and a clamping bolt arranged on said brace and engaging adjustably with said lug.

2. A machine of the character described, comprising head stocks movable toward and from each other, chucking and cutting mechanism mounted on said head stocks and adapted to operate on opposite ends of barrel shells, and automatic means for moving barrel shells to and from the working position between said head stocks comprising a track arranged horizontally and transversely between said head stocks and adapted to support and guide said barrel shells, means for propelling the barrel shells over said track comprising a carrying belt movable with its operative stretch along said track and provided with wings adapted to engage said barrel shells, supporting wheels around which said belt passes, and means for imparting an intermittent forward movement to said belt comprising a ratchet wheel turning with one of said wheels, a ratchet lever provided with a pawl engaging with said ratchet wheel, an operating lever connected with the ratchet lever, and a cam engaging said operating lever, said operating lever having an arm composed of inner and outer sections, a yoke bearing against one of said arm sections, a spring interposed between said yoke and said other arm section, and means for arresting the relative movement of said arm sections under the action of said spring.

3. A machine of the character described, comprising a support for the barrel shells to be operated on, a head stock movable toward and from said support, a cutter for operating on said barrel shells, a cutter lever pivoted to swing transversely on said head stock and carrying said cutter, a cam lever pivoted to swing vertically but incapable of movement with said head stock, a connecting rod connected at one end with said cutter lever while its opposite end is movable vertically with said cam lever and also movable with the head stock, and a cam engaging said cam lever.

4. A machine of the character described, comprising a support for the barrel shells to be operated on, a head stock movable toward and from said support, a cutter for operating on said barrel shells, a cutter lever pivoted to swing transversely on said head stock and carrying said cutter, a cam lever pivoted to swing vertically but incapable of movement with said head stock and provided with a coupling rod arranged lengthwise of the axis thereof, a connecting rod connected at its upper end with said cutter lever while its lower end is provided with a coupling head movable vertically with said coupling rod but slidable horizontally thereon, and a cam engaging with said cam lever.

5. A machine of the character described, comprising a head stock, a cutter for operating on the barrel shells to be cut, and a rock lever for operating said cutter comprising an inner section pivoted on said head stock and carrying said cutter, an outer section pivotally connected with said inner section, and adjusting screws arranged on one of these lever sections and engaging with the other lever section on opposite sides of the pivotal connection between these lever sections.

6. In a machine of the class described, a barrel shell support to engage the underside of a barrel shell, a cutter mechanism for cutting the ends of said shell, holding means to engage the shell, and automatically operating means to cause the holding means to engage and hold the shell, while the latter is in cutting position and after the cutting operation has been completed.

7. In a machine of the class described, a barrel shell support to engage the underside of a barrel shell, a cutter mechanism for cutting the ends of said shell, holding means to engage the shell, and automatically operating means to cause the holding means to engage and hold the shell, while the latter is in cutting position and after the cutting operation has been completed, said holding means including a vertically movable jaw arranged to engage a barrel shell, and said operating means including a rock arm carrying said jaw, a rock shaft carrying said rock arm, an actuating rock arm arranged on said rock shaft, a rock lever, a connecting rod connected with said rock lever and said actuating rock arm, and a cam engaging with said rock lever.

8. In a machine of the class described, a cutter mechanism for cutting the ends of barrel shells, means for removing hoops from said shells, a support engaging with said barrel shells while the same are adjacent to said cutter mechanism and said hoop removing means, holding means to engage the shells, and automatically operating means to cause the holding means to engage the shells, while the latter are in the cutting position and in the hoop removing position.

9. A machine of the character described comprising a support for the underside of barrel shells to be operated on, a cutter mechanism for cutting the ends of said shells, and holding means for engaging the upper sides of said shells while the latter are in the cutting position comprising a vertically movable jaw adapted to engage the upper side of the barrel shells after the cutting operation has been completed, a rock arm carrying said jaw, a rock shaft carrying said rock arm, an actuating rock arm arranged on said rock shaft, a rock lever, a connecting rod connected with said rock lever and said actuating rock arm, and a cam engaging with said rock lever.

10. A machine of the character described, comprising a support for the barrel shells to be operated upon, means for cutting the ends of the barrel shells while the same are on one part of said support, means for removing hoops from said shells while the latter are on another part of said support, means operating to hold said shells in place on said support while in the end cutting and hoop removing position thereon and means for operating the hoop removing means connected with the means for cutting the ends of the shells.

11. A machine of the character described, comprising a support for the barrel shells to be operated upon, means for cutting the ends of the barrel shells while the same are on one part of said support, means for removing hoops from said shells while the latter are on another part of said support, means operating to hold said shells in place on said support while in the end cutting and hoop removing position thereon, said holding means being constructed to operate alternately and means for operating the hoop removing means connected with the means for cutting the ends of the shells.

12. A machine of the character described, comprising a support for the barrel shells to be operated upon, means for cutting the ends of the barrel shells while the same are on one part of said support, means for removing hoops from said shells while the latter are on another part of said support, means operating to hold said shells in place on said support while in the end cutting and hoop removing position thereon, comprising a rock shaft, a front arm projecting forwardly from said shaft and provided with a jaw adapted to engage said shells when in the end cutting position and a rear arm projecting rearwardly from said rock shaft and provided with a jaw adapted to engage said shells in the hoop removing position and means for operating the hoop removing means connected with the means for cutting the ends of the shells.

EDWIN F. BEUGLER.

Copies of this patent may be obtained for five cents each, by addressing the "Commissioner of Patents, Washington, D. C."